(12) United States Patent
Saitoh

(10) Patent No.: US 8,488,715 B2
(45) Date of Patent: Jul. 16, 2013

(54) DESTUFF CIRCUIT AND TRANSMISSION DEVICE

(75) Inventor: Satoru Saitoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 319 days.

(21) Appl. No.: 12/872,528

(22) Filed: Aug. 31, 2010

(65) Prior Publication Data

US 2011/0051839 A1 Mar. 3, 2011

(30) Foreign Application Priority Data

Sep. 1, 2009 (JP) ................................ 2009-201529

(51) Int. Cl.
*H04L 27/00* (2006.01)
(52) U.S. Cl.
USPC ........... 375/295; 375/219; 375/259; 375/299; 375/300; 375/316
(58) Field of Classification Search
USPC ................. 375/219, 286, 295, 299, 300, 302, 375/316, 322, 354, 377
See application file for complete search history.

(56) References Cited

U.S. PATENT DOCUMENTS

| | | | |
|---|---|---|---|
| 5,729,578 A | 3/1998 | Oshita | |
| 6,404,360 B1 * | 6/2002 | Piret et al. | 341/81 |
| 7,180,914 B2 * | 2/2007 | Walker et al. | 370/505 |
| 7,499,068 B2 * | 3/2009 | Tai et al. | 347/172 |
| 7,509,482 B2 * | 3/2009 | Takahashi et al. | 712/214 |
| 7,782,778 B2 * | 8/2010 | Sheth et al. | 370/235 |
| 2003/0079118 A1 * | 4/2003 | Chow | 712/300 |
| 2006/0215553 A1 * | 9/2006 | Saitoh | 370/229 |
| 2008/0025729 A1 * | 1/2008 | Funada | 398/136 |
| 2009/0222601 A1 * | 9/2009 | Warren et al. | 710/71 |
| 2009/0225097 A1 * | 9/2009 | Van Belle | 345/597 |

FOREIGN PATENT DOCUMENTS

| | | |
|---|---|---|
| JP | 8-097816 A | 4/1996 |
| JP | 2002-217940 A | 8/2002 |
| JP | 2007-0336042 A | 12/2007 |

* cited by examiner

*Primary Examiner* — Hirdepal Singh
(74) *Attorney, Agent, or Firm* — Fujitsu Patent Center

(57) ABSTRACT

In a destuff circuit, after invalid data included in each data signal assigned to a plurality of lanes in a stuff shifter is collected to one side within the same column, then in a data rotator the number of stuffs of the respective data signals of each column is detected, and the data of the respective columns are operated to rotate in one direction, according to the detection results. Then, effective data included in the data signal of each lane that has been rotated is stored in FIFO, to thereby output signals for which ineffective data has been removed and only effective data has been extracted. As a result, it becomes possible to perform destuffing processing for parallel data signals with simple logical circuits at high speed.

9 Claims, 12 Drawing Sheets

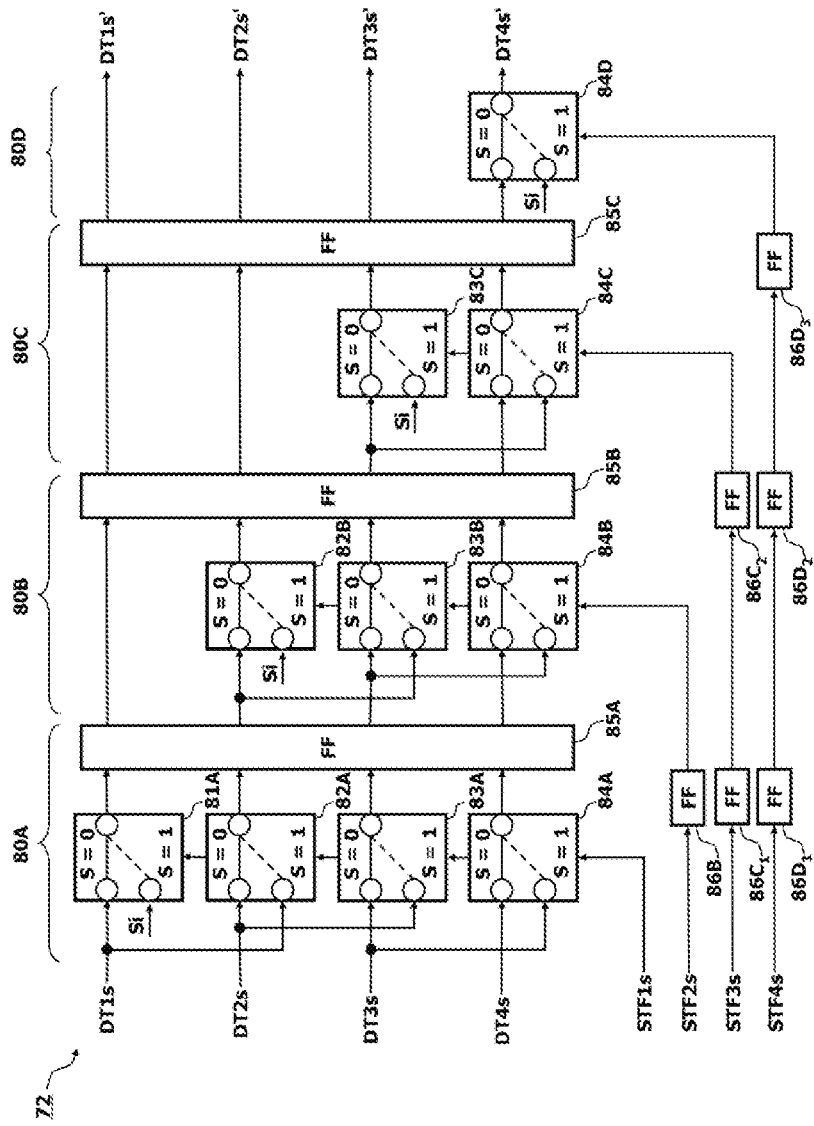

DESTUFF CIRCUIT AND TRANSMISSION DEVICE

CROSS-REFERENCE TO RELATED APPLICATION

This application is based upon and claims the benefit of priority of the prior Japanese Patent Application No. 2009-201529, filed on Sep. 1, 2009, the entire contents of which are incorporated herein by reference.

FIELD

The embodiments discussed herein are related to a destuff circuit that, in a transmission device that transfers data signals between transmission paths of different signal speeds, removes invalid data present at stuff positions of input data.

BACKGROUND

For example, in a case where an asynchronous signal is mapped and transmitted to a synchronous network, an adjustment is made between the speed of the asynchronous signal and the signal transmission speed in the synchronous network, using the concept of "stuffing" (for example, refer to Japanese Laid-open Patent Publication No. 2002-217940). This signal speed adjustment based on stuffing is such that in a case of performing mapping of an asynchronous signal, when the amount of information of the asynchronous signal is low, invalid data is inserted to a predetermined stuff position with respect to the data column of the asynchronous signal, and the clock frequency corresponding to the post-mapping signal is matched with the clock frequency in the synchronous network. When the amount of information of the asynchronous signal is high, the invalid data at the above stuff position is replaced with valid data.

On the side where the signal that has been transmitted through the synchronous network is demapped, the transmitted signal is input to a destuff circuit, and a destuffing process for removing invalid data included in the input data and extracting only valid data is performed based on the information related to the stuffing insertion position, to thereby re-generate an asynchronous signal the same as that prior to transmission through the synchronous network. The stuffing insertion position is defined as a portion which is predetermined according to the mapping specification, or is found by calculation based on the overhead information of the transmission signal.

FIG. 1 is a diagram illustrating a configuration example of a generic destuff circuit that processes comparatively low-speed signals. This destuff circuit is configured with use of an elastic type FIFO (first-in first-out) 101. If the destuff circuit judges that the input data corresponds to invalid data (S1, S2 in FIG. 1) based on the information related to the stuffing insertion position in the input data to the FIFO 101, an enabling signal EN that controls data writing into the FIFO 101 to be performed according to a writing clock signal CLK-W is made a low level, and thereby data writing into the FIFO 101 is disabled. Consequently, the invalid data is removed from the input data to the FIFO 101, and valid data (D1, D2, to D6 in FIG. 1) is read out from the FIFO according to a reading clock signal CLK-R.

In the destuff circuit described above, there is employed a method where data is parallel-processed and the operating clock of the circuit is suppressed low as signals to be processed become faster (for example, refer to Japanese Laid-open Patent Publication No. 2007-336042). Specifically, as illustrated in FIG. 2 for example, parallel data signals DT1 to DT4 assigned to four lanes are input to a matrix switch 201 having four input ports and four output ports, and the matrix switch 201 performs switching operations according to control signals that are output from a switch control circuit 202 based on signals indicating a stuff position in the respective lanes, to thereby sort data within a same column to be input to the matrix switch 201 at the same timing. The parallel data signals output from the matrix switch 201 are respectively input to FIFOs $203_1$ to $203_4$ corresponding to the respective lanes, and the respective FIFOs $203_1$ to $203_4$ operate in a manner similar to that in the case of FIG. 1 described above, to thereby output parallel data signals DT1out to DT4out in which invalid data are removed and only valid data are extracted.

However, in conventional destuff circuits that parallel-process input data such as illustrated in FIG. 2 above, there is a problem in that the configuration of the matrix switch circuit that sorts data according to stuff positions becomes complex, and consequently it is difficult to perform input data sorting at high speed and the speed of a destuffing process is restricted. This problem becomes significant when the parallel number of input data becomes higher and the number of input/output ports of the matrix switch becomes higher, and it consequently makes realization of a destuff circuit capable of handling signals of even higher speed difficult.

SUMMARY

Accordingly, the invention provides a destuff circuit that parallel-processes input data to thereby remove invalid data inserted in a stuff position of the input data and extract valid data. One aspect of this destuff circuit includes: a stuff shifter configured to input a plurality of data signals assigned to a plurality of lanes, and a plurality of stuff signals indicating a stuff position of each of the data signals, and configured to shift within a same column invalid data inserted in the stuff position of each of the data signals; a data rotator configured to input data signals of the respective lanes output from the stuff shifter, and stuff signals that respectively correspond to the respective data signals, and configured to detect, based on the respective stuff signals, a number of stuffs of the respective data signals of each column, and configured to operate to rotate the data of the respective data signals of each column in one direction, according to the detection results; and a buffer memory configured to store and output valid data included in the data signal of each lane output from the data rotator in first-in-first-out fashion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a circuit diagram illustrating an example of a specific configuration of a stuff circuit in FIG. 12.

DESCRIPTION OF EMBODIMENTS

Hereunder, an embodiment of the invention is described in detail, with reference to the accompanying drawings.

Figure 3:
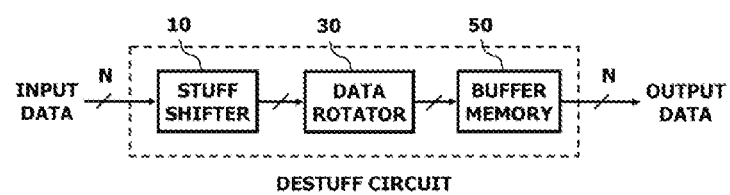
FIG. 3 is a block diagram illustrating a configuration of an embodiment of a destuff circuit.

FIG. 3 is a block diagram illustrating a configuration of an embodiment of a destuff circuit.

In FIG. 3, the destuff circuit of the present embodiment is provided with a stuff shifter 10, a data rotator 30, and a buffer memory 50.

The stuff shifter 10 receives inputs of parallel data signals assigned to a plurality of lanes, and shifts and collects invalid data in the input data within the same column to one side, based on the position information of stuffs in the respective lanes. The data rotator 30 detects the number of stuffs of each column of the parallel data signals output from the stuff shifter 10, and operates to rotate the data of each column in one direction according to the detection results. The buffer memory 50 stores and outputs valid data of the parallel data signals output from the data rotator 30 in first-in-first-out (FIFO) fashion. The stuff shifter and data rotator may comprise a circuit, for example. The stuff shifter may comprise a circuit, for example.

Hereunder, a specific configuration of each section of the above destuff circuit is described in detail, with reference to an example of a case where destuffing processes are to be performed on a byte unit basis so as to correspond to standards including OTN (Optical Transport Network), and SONET/SDH (Synchronous Optical NETwork/Synchronous Digital Hierarchy). However, the invention is not to be considered as limited to a destuffing process on a byte unit basis, and the invention is also effective in those cases where the destuffing process is performed on a bit unit basis.

Figure 4:
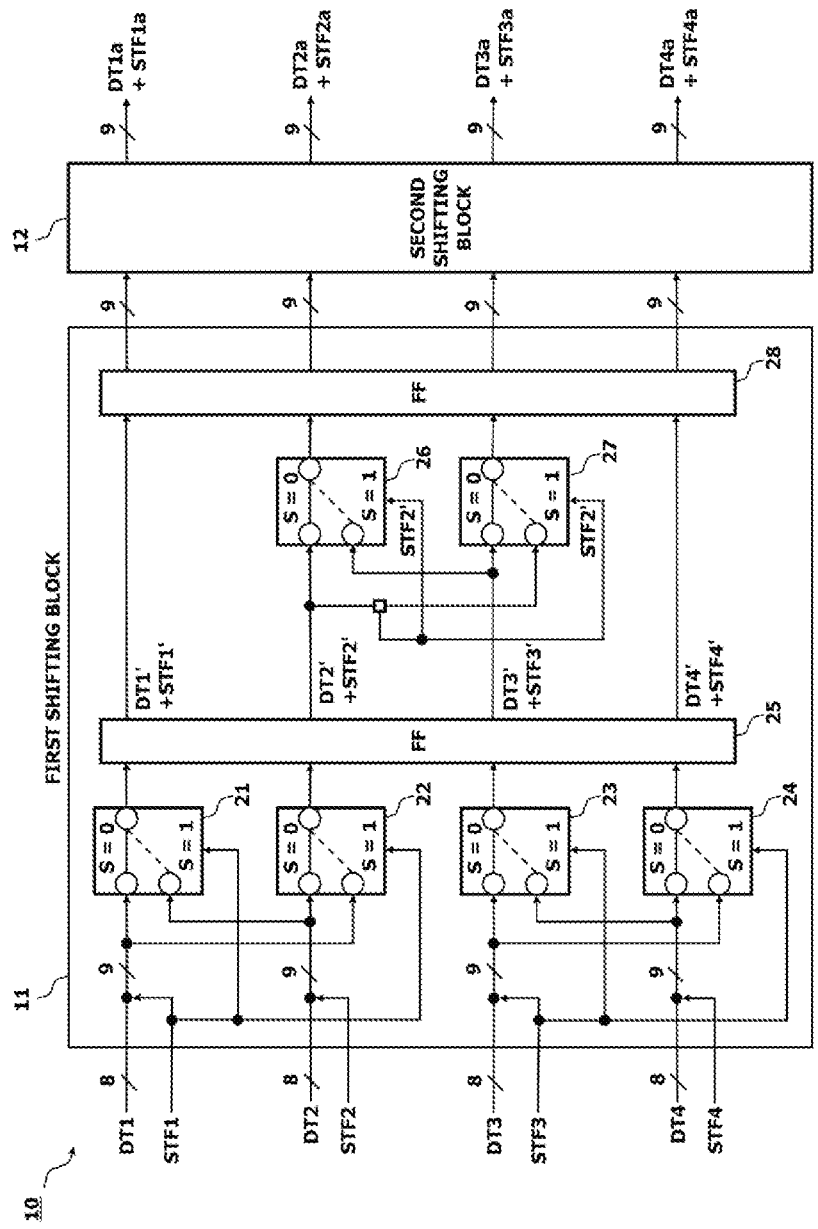
FIG. 4 is a circuit diagram illustrating an example of a specific configuration of a stuff shifter in FIG. 3.

FIG. 4 is a circuit diagram illustrating an example of a specific configuration of the above stuff shifter 10.

In FIG. 4, the stuff shifter 10 has: a first shifting block 11, to which there are given, for example, respective data signals DT1, DT2, DT3, and DT4 in which 32-bit parallel data signals are assigned to four lanes on a byte unit basis, and stuff signals STF1, STF2, STF3 and STF4 respectively corresponding to the respective data signals DT1 to DT4; and a second shifting block 12 that is connected in series to the first shifting block 11. The first and second shifting blocks 11 and 12 are of the same circuit configuration, and therefore, FIG. 4 only illustrates the circuit configuration within the first shifting block 11 and omits an illustration of the circuit configuration within the second shifting block 12.

The data signals DT1 to DT4 are signals into which invalid data are inserted on a byte unit basis in the stuffing process performed on the transmitting side (not illustrated in the diagram). Moreover, the stuff signals STF1 to STF4 are 1 bit signals indicating information related to the stuff positions of the corresponding data signals DT1 to DT4. Here, when the bit value of the stuff signals STF1 to STF4 is "1", they indicate that the byte of the corresponding data signals DT1 to DT4 is invalid data corresponding to the stuff position, and when the bit value is "0", they indicate that the byte of the corresponding data signals DT1 to DT4 is valid data not corresponding to the stuff position.

The first shifting block 11 comprises, for example, a former stage portion that combines four 2-input/1-output selectors 21, 22, 23, and 24 and a flip-flop (FF) 25, and a latter stage portion that combines two 2-input/1-output selectors 26 and 27 and a flip-flop (FF) 28.

The selector 21 receives to one of the two input terminals thereof, an input of a 9-bit signal that combines the data signal DT1 of the four data signals DT1 to DT4 that corresponds to the first lane and the stuff signal STF1 (hereunder, referred to as DT1+STF1 signal). Moreover, the selector 21 receives to the other input terminal of the two input terminals thereof, an input of a 9-bit signal that combines the data signal DT2 of the four data signals DT1 to DT4 that corresponds to the second lane and the stuff signal STF2 (hereunder, referred to as DT2+STF2 signal). In a case where the bit value of the stuff signal STF1 input to the control terminal is "0", that is to say, where the byte of the data signal DT1 is valid data, the selector 21 selects the DT1+STF1 signal input to the one input terminal and outputs it from the output terminal thereof. Moreover, in a case where the bit value of the stuff signal STF1 is "1", that is to say, where the byte of the data signal DT1 is invalid data, the selector 21 selects the DT2+STF2 signal given to the other input terminal and outputs it from the output terminal thereof.

The selector 22 receives to one of the two input terminals thereof, an input of the DT2+STF2 signal, and receives an input of the DT1+STF1 signal to the other input terminal thereof. In a case where the bit value of the stuff signal STF1 input to the control terminal is "0", this selector 22 selects the DT2+STF2 signal input to the one input terminal and outputs it from the output terminal thereof, and in a case where the bit value of the stuff signal STF1 is "1", the selector 22 selects the DT1+STF1 signal given to the other input terminal and outputs it from the output terminal thereof.

The selector 23 receives to one of the two input terminals thereof, an input of a 9-bit signal that combines the data signal DT3 of the four data signals DT1 to DT4 that corresponds to the third lane and the stuff signal STF3 (hereunder, referred to as DT3+STF3 signal). Moreover, the selector 23 receives to the other input terminal of the two input terminals thereof, an input of a 9-bit signal that combines the data signal DT4 of the four data signals DT1 to DT4 that corresponds to the fourth lane and the stuff signal STF4 (hereunder, referred to as DT4+STF4 signal). In a case where the bit value of the stuff signal STF3 input to the control terminal is "0", that is to say, where the byte of the data signal DT3 is valid data, the selector 23 selects the DT3+STF3 signal input to the one input terminal and outputs it from the output terminal thereof. Moreover, in a case where the bit value of the stuff signal STF3 is "1", that is to say, where the byte of the data signal DT3 is invalid data, the selector 23 selects the DT4+STF4 signal given to the other input terminal and outputs it from the output terminal thereof.

The selector 24 receives to one of the two input terminals thereof, an input of the DT4+STF4 signal, and receives an input of the DT3+STF3 signal to the other input terminal thereof. In a case where the bit value of the stuff signal STF3 input to the control terminal is "0", this selector 24 selects the DT4+STF4 signal input to the one input terminal and outputs it from the output terminal thereof, and in a case where the bit value of the stuff signal STF3 is "1", the selector 24 selects the DT3+STF3 signal given to the other input terminal and outputs it from the output terminal thereof.

The flip-flop 25 latches the signals respectively output from the respective selectors 21 to 24, and transmits them to the latter stage portion of the first shifting block 11. The process performed within the respective selectors 21 to 24 and the flip-flop 25, is performed on every 9-bit in which a data signal on a byte unit basis and a 1 bit stuff signal are combined.

The selector 26 receives to one of the two input terminals thereof, an input of a 9-bit signal transmitted from the selector 22 of the former stage portion through the flip-flop 25, that combines a data signal DT2' and a stuff signal STF2' corresponding thereto (hereunder, referred to as DT2'+STF2' signal). Moreover, the selector 26 receives to the other input terminal of the two input terminals thereof, an input of a 9-bit signal transmitted from the selector 23 of the former stage portion through the flip-flop 25, that combines a data signal DT3' and a stuff signal STF3' corresponding thereto (hereunder, referred to as DT3'+STF3' signal). To the control terminal of the selector 26, there is given the stuff signal STF2' taken out from the DT2'+STF2' signal. In a case where the bit value of the stuff signal STF2' is "0", that is to say, where the byte of the data signal DT2' is valid data, the selector 26 selects the DT2'+STF2' signal input to the one input terminal and outputs it from the output terminal thereof. Moreover, in a case where the bit value of the stuff signal STF2' is "1", that is to say, where the byte of the data signal DT2' is invalid data, the selector 26 selects the DT3'+STF3' signal given to the other input terminal and outputs it from the output terminal thereof.

The selector 27 receives to one of the two input terminals thereof, an input of the DT3'+STF3' signal, and receives an input of the DT2'+STF2' signal to the other input terminal thereof. In a case where the bit value of the stuff signal STF2' input to the control terminal is "0", this selector 27 selects the DT3'+STF3' signal input to the one input terminal and outputs it from the output terminal thereof, and in a case where the bit value of the stuff signal STF2' is "1", the selector 27 selects the DT2'+STF2' signal given to the other input terminal and outputs it from the output terminal thereof.

The flip-flop 28 latches respectively the DT1'+STF1' signal and the DT4'+STF4' signal transmitted from the selectors 21 and 24 of the former stage portion through the flip-flop 25, and signals output from the respective selectors 26 and 27, and transmits them to the second shifting block 12. The process performed within the respective selectors 26 to 27 and the flip-flop 28, is also performed on every 9-bit in which a data signal on a byte unit basis and a 1 bit stuff signal are combined.

The second shifting block 12 is of a circuit configuration the same as that of the first shifting block 11. The second shifting block 12, from the flip-flop 28 of the latter stage portion: outputs a DT1$a$+STF1$a$ signal as a first lane output signal that combines a data signal DT1$a$ and a stuff signal STF1$a$ corresponding thereto; outputs a DT2$a$+STF2$a$ signal as a second lane output signal that combines a data signal DT2$a$ and a stuff signal STF2$a$ corresponding thereto; outputs a DT3$a$+STF3$a$ signal as a third lane output signal that combines a data signal DT3$a$ and a stuff signal STF3$a$ corresponding thereto; and outputs a DT4$a$+STF4$a$ signal as a fourth lane output signal, that combines a data signal DT4$a$ and a stuff signal STF4$a$ corresponding thereto.

Figure 5:
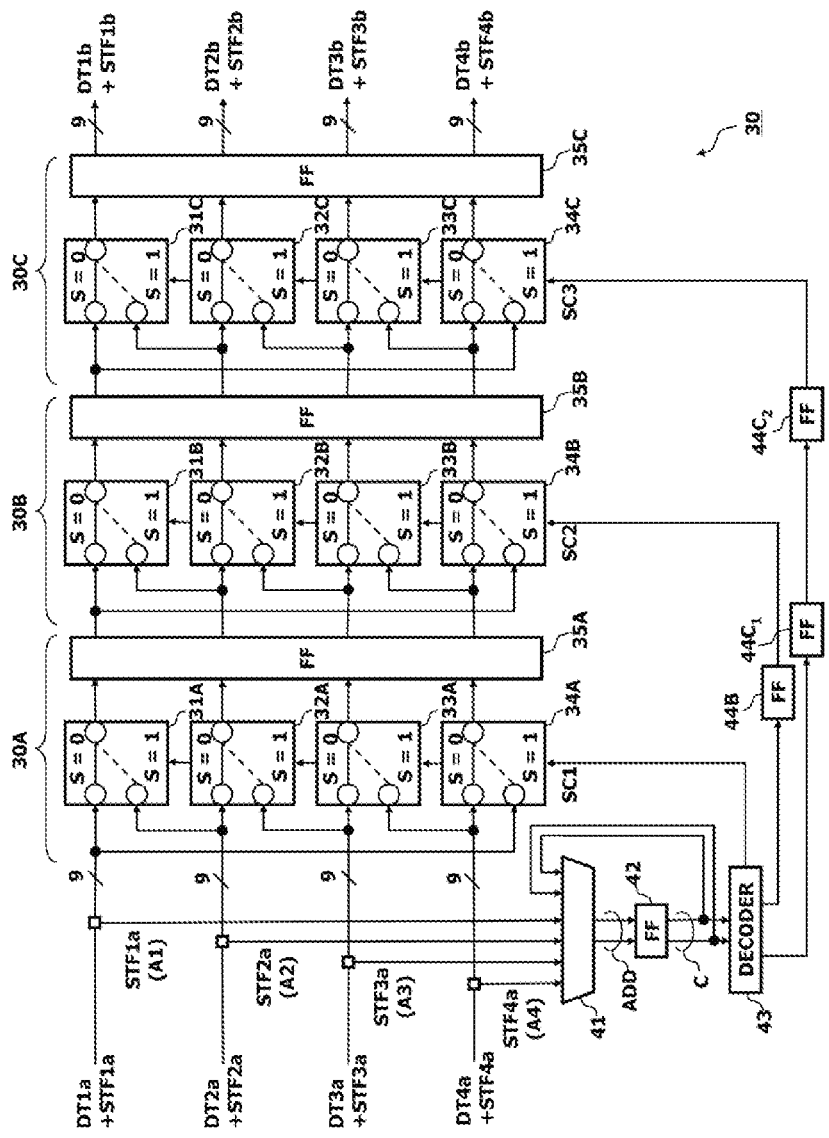
FIG. 5 is a circuit diagram illustrating an example of a specific configuration of a data rotator in FIG. 3.

FIG. 5 is a circuit diagram illustrating an example of a specific configuration of the data rotator 30 in FIG. 3.

In FIG. 5, the data rotator 30, for example, is provided with: a first rotating block 30A that combines four 2-input/1-output (2×1) selectors 31A, 32A, 33A, and 34A, and a flip-flop (FF) 35A; a second rotating block 30B that combines four 2-input/1-output (2×1) selectors 31B, 32B, 33B, and 34B, and a flip-flop (FF) 35B; and a third rotating block 30C that combines four 2-input/1-output (2×1) selectors 31C, 32C, 33C, and 34C, and a flip-flop (FF) 35C. Moreover, the data rotator 30 is provided with: an adding circuit 41 and a flip-flop 42 for detecting the number of stuffs of each column in the data signals DT1$a$ to DT4$a$ included in the output signals from the stuff shifter 10; and a decoder 43 and flip-flops 44B, 44$C_1$, and 44$C_2$ for controlling the selectors 31A to 34A, 31B to 34B, and 31C to 34C of the respective stages, according to the results of detecting the number of stuffs.

The selector 31A of the first rotating block 30A receives to one of the two input terminals thereof, an input of the DT1$a$+STF1$a$ signal output from the stuff shifter 10, and receives to the other input terminal, the DT2$a$+STF2$a$ signal output from the stuff shifter 10. To the control terminal of this selector 31A, there is given a control signal SC1 output from the decoder 43, which is described later. In a case where the bit value of the control signal SC1 is "0", the selector 31A selects the DT1$a$+STF1$a$ signal input to the one input terminal and outputs it from the output terminal thereof, and in a case where the bit value of the control signal SC1 is "1", the selector 31A selects the DT2$a$+STF2$a$ signal given to the other input terminal and outputs it from the output terminal thereof.

The selector 32A receives to one of the two input terminals thereof, an input of the DT2$a$+STF2$a$ signal output from the stuff shifter 10, and receives to the other input terminal, an input of the DT3$a$+STF3$a$ signal output from the stuff shifter 10. In a case where the bit value of the control signal SC1 input to the control terminal is "0", this selector 32A selects the DT2$a$+STF2$a$ signal input to the one input terminal and outputs it from the output terminal thereof, and in a case where the bit value of the control signal SC1 is "1", the selector 32A selects the DT3$a$+STF3$a$ signal given to the other input terminal and outputs it from the output terminal thereof.

The selector 33A receives to one of the two input terminals thereof, an input of the DT3$a$+STF3$a$ signal output from the stuff shifter 10, and receives to the other input terminal, an input of the DT4$a$+STF4$a$ signal output from the stuff shifter 10. In a case where the bit value of the control signal SC1 given to the control terminal is "0", this selector 33A selects the DT3$a$+STF3$a$ signal input to the one input terminal and outputs it from the output terminal thereof, and in a case where the bit value of the control signal SC1 is "1", the selector 33A selects the DT4$a$+STF4$a$ signal given to the other input terminal and outputs it from the output terminal thereof.

The selector 34A receives to one of the two input terminals thereof, an input of the DT4$a$+STF4$a$ signal output from the stuff shifter 10, and receives to the other input terminal, an input of the DT1$a$+STF1$a$ signal output from the stuff shifter 10. In a case where the bit value of the control signal SC1 given to the control terminal is "0", this selector 34A selects the DT4$a$+STF4$a$ signal input to the one input terminal and outputs it from the output terminal thereof, and in a case where the bit value of the control signal SC1 is "1", the selector 34A selects the DT1a+STF1a signal given to the other input terminal and outputs it from the output terminal thereof.

The flip-flop 35A latches the signals respectively output from the respective selectors 31A to 34A, and transmits them to the second rotating block 30B. The process performed within the respective selectors 31A to 34A and the flip-flop 35A, is performed on every 9-bit in which a data signal on a byte unit basis and a 1 bit stuff signal are combined.

The respective selectors 31B to 34B and the flip-flop 35B of the second rotating block 30B, and the respective selectors 31C to 34C and the flip-flop 35C of the third rotating block 30C, are also of a configuration similar to that of the respective selectors 31A to 34A and the flip-flop 35A of the first rotating block 30A, and the respective selectors 31B to 34B of the second rotating block 30B operate according to the bit value of a control signal SC2 given from the decoder 43 through the flip-flop 44B to each of the control terminals. Moreover, the respective selectors 31C to 34C of the third rotating block 30C operate according to the bit value of a control signal SC3 given from the decoder 43 through the flip-flops $44C_1$ and $44C_2$ to each of the control terminals. The flip-flop 35C of the third rotating block 30C outputs a DT1b+STF1b signal as a first lane output signal that combines a data signal DT1b and a stuff signal STF1b corresponding thereto, and outputs a DT2b+STF2b signal as a second lane output signal that combines a data signal DT2b and a stuff signal STF2b corresponding thereto. Moreover, the flip-flop 35C of the third rotating block 30C outputs a DT3b+STF3b signal as a third lane output signal that combines a data signal DT3b and a stuff signal STF3b corresponding thereto, and outputs a DT4b+STF4b signal as a fourth lane output signal that combines a data signal DT4b and a stuff signal STF4b corresponding thereto.

The adding circuit 41 receives inputs of the stuff signals STF1a to STF4a respectively taken out from the respective output signals from the stuff shifter 10, and the output signal of the flip-flop 42 of the latter stage; adds the bit values indicated by the respective input signals in synchronization with clock signal timings synchronized with the data signals DT1a to DT4a; and outputs a 2-bit signal ADD that indicates the value obtained by the addition, to the flip-flop 42. The flip-flop 42 latches the output signal ADD from the adding circuit 41, and outputs a 2-bit signal C that indicates the previous value obtained by the addition performed in the adding circuit 41, to the decoder 43 and the adding circuit 41. With the combination of the adding circuit 41 and the flip-flop 42, the adding circuit 41 finds the total number of stuffs up to the current point in time included in the input data to the data rotator 30, and the signal ADD that indicates the total number as a cyclic count value between 0 and 3, is transmitted to the decoder 43 through the flip-flop 42.

According to the count value indicated by the output signal C of the flip-flop 42, the decoder 43 generates the signals SC1 to SC3 that respectively control data rotating operations in the first to third rotating blocks 30A to 30C. The value of each of the control signals SC1 to SC3 is set such that: SC1=SC2=SC3=0 when C=0; SC1=1 and SC2=SC3=0 when C=1; SC1=SC2=1 and SC3=0 when C=2; and SC1=SC2=SC3=1 when C=3. The control signal SC1 generated by the decoder 43 is given respectively to the control terminals of the respective selectors 31A to 34A of the first rotating block 30A. The control signal SC2 is given respectively to the control terminals of the respective selectors 31B to 34B of the second rotating block 30B through the one flip-flop 44B. The control signal SC3 is given respectively to the control terminals of the respective selectors 31C to 34C of the third rotating block 30C through the two flip-flops $44C_1$ and $44C_2$.

Figure 6:
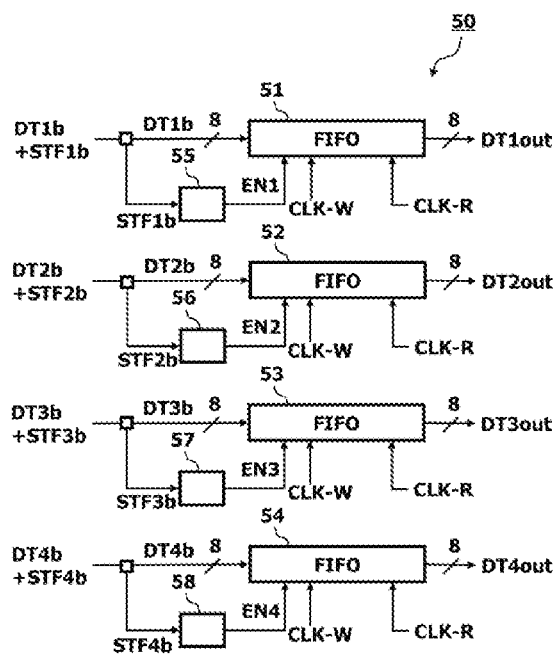
FIG. 6 is a circuit diagram illustrating an example of a specific configuration of a buffer memory in FIG. 3.

FIG. 6 is a circuit diagram illustrating an example of a specific configuration of the buffer memory 50 illustrated in FIG. 3.

In FIG. 6, the buffer memory 50 has, for example, four elastic type FIFOs 51 to 54 and control circuits 55 to 58 that control data writing to the FIFOs 51 to 54.

The FIFOs 51 to 54 respectively receive inputs of the data signals DT1b to DT4b taken out from the output signals from the data rotator 30; perform data writing according to the writing clock signals CLK-W synchronized with the data signals DT1b to DT4b; and perform data reading according to the reading clock signals CLK-R of a frequency lower than that of the writing clock signals CLK-W.

The control circuits 55 to 58 respectively generate enable signals EN1 to EN4 that control data writing to the FIFOs 51 to 54, according to the stuff signals taken out from the output signals from the data rotator 30. The enable signals EN1 to EN4 become a low level when the FIFOs 51 to 54 receive an input of invalid data corresponding to the stuff position, thereby disabling data writing to the FIFOs 51 to 54.

Next, operation of the destuff circuit of the present embodiment is described.

Figure 1:
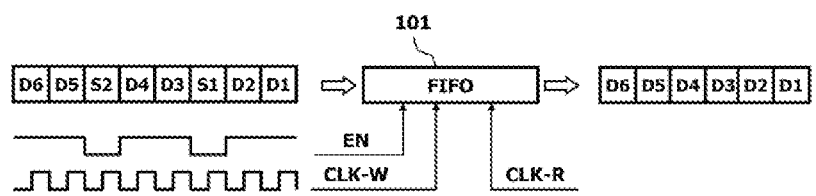
FIG. 1 is a diagram illustrating a configuration example of a generic destuff circuit that processes low-speed signals.
Figure 2:
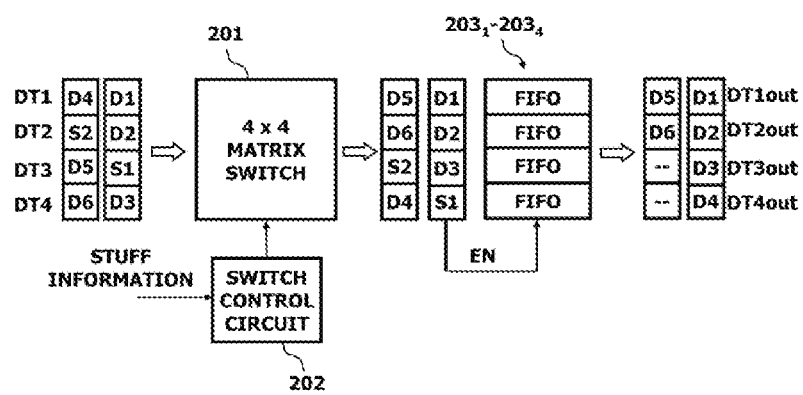
FIG. 2 is a diagram illustrating a configuration example of a conventional destuff circuit capable of handling parallel processing.

In the destuff circuit of the configuration described above, in order to realize a function that corresponds to the matrix switch in the conventional destuff circuit illustrated in FIG. 2 described above, first, in the stuff shifter 10, a bottom packing process is performed in which the invalid data inserted in the data signals DT1 to DT4 are shifted downward within the same column. Then, in the data rotator 30, the number of stuffs of each column of the data signals DT1a to DT4a output from the stuff shifter 10, is detected, and the data of the respective columns are operated to rotate in one direction according to the detection results. In the buffer memory 50, the data signals DT1b to DT4b output from the data rotator 30 are stored in the FIFOs 51 to 54 as with the case of the conventional destuff circuit, and thereby data signals DT1out to DT4out, in which invalid data has been removed and only valid data has been extracted, out output from the FIFOs 51 to 54.

Here, a process in the respective sections of the above destuff circuit is described in detail, with a reference to a specific example.

Figure 7:
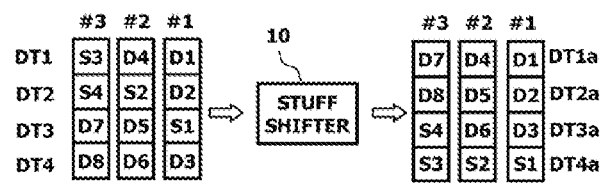
FIG. 7 is a diagram for describing a process performed in the stuff shifter in FIG. 4.
Figure 7:
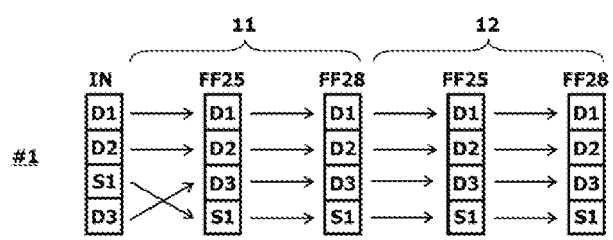
Figure 7:
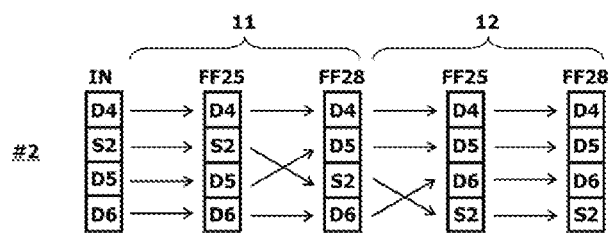
Figure 7:
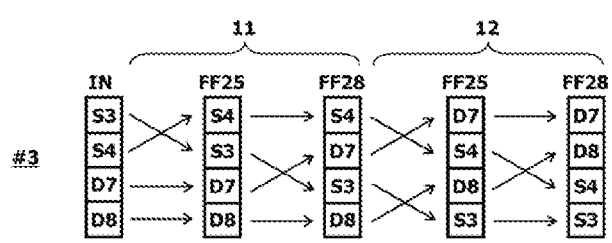

Assuming a case where parallel data comprising data signals DT1 to DT4 illustrated on the top left side of FIG. 7 are input to the stuff shifter 10, the process in the stuff shifter 10 is such that for the 4 bytes of the first column #1 of the input data, the bytes corresponding to the data signals DT1, DT2, and DT4 are valid data D1, D2, and D3 while the byte corresponding to the data signal DT3 is invalid data S1 corresponding to the stuff position, and accordingly the stuff shifter 10 executes the process of downward-shifting and bottom-packing the invalid data S1 of this third lane. In the following description, the arrangement of the 4 bytes in the first column #1 is noted as (D1, D2, S1, D3) in a sequential order from the first lane, and the arrangement of the 4 bytes of the other columns is noted in a similar manner.

Specifically, the 4 bytes of the first column #1 input to the stuff shifter 10, as illustrated on the second row in FIG. 7, are input respectively to the selectors 21 to 24 in the former stage portion of the first shifting block 11 (FIG. 4). At this time, the bit value of the stuff signal STF1 corresponding to the data signal DT1 becomes "0" indicating that the byte of the data signal DT1 does not correspond to the stuff position, and the bit value of the stuff signal STF3 corresponding to the data signal DT3 becomes "1" indicating that the byte of the data signal DT3 corresponds to the stuff position. Consequently, the DT1+STF1 signal is selected in the selector 21, the DT2+STF2 signal is selected in the selector 22, the DT4+STF4 signal is selected in the selector 23, and the DT3+STF3 signal is selected in the selector 24. Accordingly, the invalid data S1 of the third lane and the valid data D3 of the fourth lane are swapped (FIG. 7), and the arrangement of the 4 bytes of the first column #1 in the data signals DT1' to DT4' output from the flip-flop 25, becomes (D1, D2, D3, S1).

The output signal of the flip-flop 25 is transmitted to the latter stage portion of the first shifting block 11 (FIG. 4), the DT2'+STF2' signal of the second lane and the DT3'+STF3' signal of the third lane are input to the selectors 26 and 27, and the DT1'+STF1' signal of the first lane and the DT4'+STF4' of the fourth lane are input to the flip-flop 28. At this time, the bit value of the stuff signal STF2' corresponding to the data signal DT2' becomes "0" indicating that the byte of the data signal DT2' does not correspond to the stuff position, and accordingly, the DT2'+STF2' signal is selected in the selector 26 and the DT3'+STF3' signal is selected in the selector 27. Therefore, data swap is not performed in the latter stage portion of the first shifting block 11 (FIG. 7), and the arrangement (D1, D2, D3, S1) of the 4 bytes of the first column #1 in the output signal of the flip-flop 28 is maintained.

Next, the output signal of the flip-flop 28 is transmitted to the second shifting block 12 having a circuit configuration the same as that of the first shifting block 11. In the second shifting block 12, the invalid byte S1 of the first column #1 is in a state of having been shifted to the fourth lane and bottom-packed by the process of the first shifting block 11, and consequently, data swap is performed in the former stage portion and the latter stage portion. Therefore, the arrangement of the 4 bytes of the first column #1 in the output signal of the flip-flop 28 of the second shifting block 12 (D1, D2, D3, S1) is also maintained.

Moreover, as for the 4 bytes of the second column #2 in the data signals DT1 to DT4 input to the stuff shifter 10, the byte corresponding to the data signals DT1, DT3, and DT4 are valid data D4, D5, and D6, while the byte corresponding to the data signal DT2 is invalid data S2 corresponding to the stuff position, and accordingly, the stuff shifter 10 executes the process of downward-shifting and bottom-packing the invalid data S2 of this second lane.

Specifically, as illustrated on the third row in FIG. 7, the 4 bytes of the second column #2 are respectively input to the selectors 21 to 24 (FIG. 4) in the former stage portion of the first shifting block 11. At this time, each of the bit values of the stuff signals STF1 and STF3 corresponding to the data signals DT1 and DT3 become "0", and consequently the DT1+STF1 signal is selected in the selector 21, the DT2+STF2 signal is selected in the selector 22, the DT3+STF3 signal is selected in the selector 23, and the DT4+STF4 signal is selected in the selector 24. Therefore, data swap is not performed in the former stage portion of the first shifting block 11 (FIG. 7), and the arrangement of the 4 bytes of the second column #2 in the output signal of the flip-flop 25 becomes (D4, S2, D5, D6)

The output signal of the flip-flop 25 is transmitted to the latter stage portion of the first shifting block 11 (FIG. 4), the bit value of the stuff signal STF2' corresponding to the data signal DT2' at this time becomes "1", and consequently, the DT3'+STF3' signal is selected in the selector 26, and the DT2'+STF2' signal is selected in the selector 27. Accordingly, the invalid data S2 of the second lane and the valid data D5 of the third lane are swapped (FIG. 7), and the arrangement of the 4 bytes of the second column #2 in the output signal of the flip-flop 28 becomes (D4, D5, S2, D6).

Next, the output signal of the flip-flop 28 is transmitted to the former stage portion of the second shifting block 12. At this time, the bit value of the stuff signal corresponding to the data signal of the first lane becomes "0", and the bit value of the stuff signal corresponding to the data signal of the third lane becomes "1". Consequently, the invalid data S2 of the third lane and the valid data of the fourth lane are swapped, and the arrangement of the 4 bytes of the second column #2 in the output signal of the flip-flop 25 of the second shifting block 12 becomes (D4, D5, D6, S2). The output signal of this flip-flop 25 is transmitted to the latter stage portion of the second shifting block 12. In the latter stage portion, the invalid byte S2 is in a state of having been shifted to the fourth lane and bottom-packed by the process of the former stage portion, and consequently, data swap is not performed. Therefore, the arrangement of the 4 bytes of the second column #2 in the output signal of the flip-flop 28 of the second shifting block 12 (D4, D5, D6, S2) is maintained.

Furthermore, as for the 4 bytes of the third column #3 in the data signals DT1 to DT4 input to the stuff shifter 10, the byte corresponding to the data signals DT1 and DT2 are invalid data S3 and S4 corresponding to the stuff position, while the byte corresponding to the data signal DT3 and DT4 are valid data D7 and D8, and accordingly, the stuff shifter 10 executes the process of downward-shifting and bottom-packing the invalid data S3 and S4 of the first and second lanes.

Specifically, as illustrated on the fourth row in FIG. 7, the 4 bytes of the third column #3 are respectively input to the selectors 21 to 24 (FIG. 4) in the former stage portion of the first shifting block 11. At this time, the bit value of the stuff signal STF1 corresponding to the data signal DT1 becomes "1", and the bit value of the stuff signal STF3 corresponding to the data signal DT3 becomes "0". Consequently, the DT2+STF2 signal is selected in the selector 21, the DT1+STF1 signal is selected in the selector 22, the DT3+STF3 signal is selected in the selector 23, and the DT4+STF4 signal is selected in the selector 24. Accordingly, the invalid data S3 of the first lane and the invalid data S4 of the second lane are swapped (FIG. 7), and the arrangement of the 4 bytes of the third column #3 in the data signals DT1' to DT4' output from the flip-flop 25, becomes (S4, S3, D7, D8).

The output signal of the flip-flop 25 is transmitted to the latter stage portion of the first shifting block 11 (FIG. 4), the bit value of the stuff signal STF2' corresponding to the data signal DT2' at this time becomes "1", and consequently, the DT3'+STF3' signal is selected in the selector 26, and the DT2'+STF2' signal is selected in the selector 27. Accordingly, the invalid data S3 of the second lane and the valid data D7 of the third lane are swapped (FIG. 7), and the arrangement of the 4 bytes of the third column #3 in the output signal of the flip-flop 28 becomes (S4, D7, S3, D8).

Next, the output signal of the flip-flop 28 is transmitted to the former stage portion of the second shifting block 12. At this time, the respective bit values of the stuff signals corresponding to the respective data signals of the first and third lanes, both become "1". Consequently, the invalid data S4 of the first lane and the valid data D7 of the second lane are swapped, and the invalid data S3 of the third lane and the valid data D8 of the fourth lane are swapped. Therefore, the arrangement of the 4 bytes of the third column #3 in the output signal of the flip-flop 25 of the second shifting block 12, becomes (D7, S4, D8, S3).

The output signal of the flip-flop 25 of the second shifting block 12 is transmitted to the latter stage portion of the second shifting block 12, and the bit value of the stuff signal corresponding to the data signal of the second lane at this time becomes "1". Consequently, the invalid data S4 of the second lane and the valid data D8 of the third lane are swapped. Accordingly, the arrangement of the 4 bytes of the third column #3 in the output signal of the flip-flop 28 of the second shifting block 12 becomes (D7, D8, S4, S3), and the invalid data S3 and S4 are brought to a state of having been shifted to the fourth and third lanes and bottom-packed. In a state of being bottom-packed, the order of the invalid data S3 and S4 are reversed, however, the invalid data will be removed in the buffer memory 50 as described later and will not become a problem.

As described above, in the stuff shifter 10, the 4 bytes of the respective columns of the input data signals DT1 to DT4 are sequentially send through the first and second shifting blocks 11 and 12, and thereby the invalid data inserted in arbitrary positions are collected to the down side within the same column. As a result, there are generated the data signals DT1$a$ to DT4$a$ in which the invalid data S1 to S4 of the respective columns are bottom-packed as illustrated on the top right side of FIG. 7. The data signals DT1$a$ to DT4$a$ are transmitted along with the stuff signals STF1$a$ to STF4$a$ corresponding thereto, to the data rotator 30.

Figure 8:
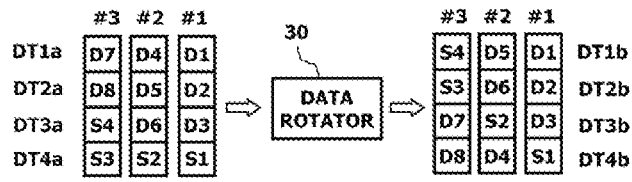
FIG. 8 is a diagram for describing a process performed in the data rotator in FIG. 5.
Figure 8:
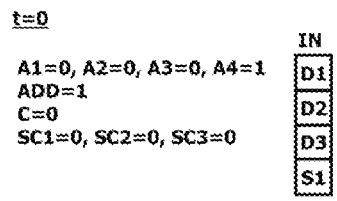
Figure 8:
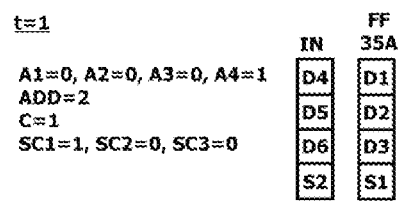
Figure 8:
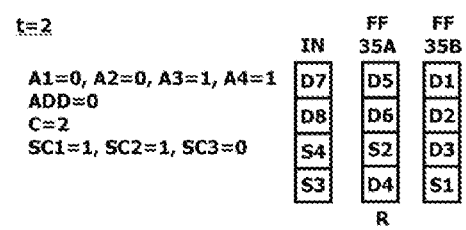
Figure 8:
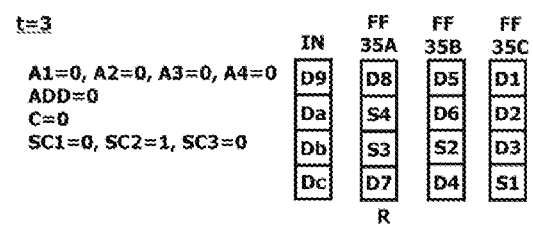

The process in the data rotator 30 is such that as illustrated in the upper portion of FIG. 8: the number of stuffs included in the respective columns of the data signals DT1$a$ to DT4$a$ input to the data rotator 30 are detected over time; the cumulative count thereof is expressed as a cyclic count value between 0 and 3; the respective selectors 31A to 34A, 31B to 34B, and 31C to 34C of the first to third rotating blocks 30A to 30C are controlled according to the count values; and thereby the data of the respective columns are operated to rotate in one direction.

Here, the process of the data rotator 30 is traced as time t advances, where: the point in time at which the 4 bytes of the first column #1 of the data signals DT1$a$ to DT4$a$ output from the stuff shifter 10 are input to the first rotating block 30A of the data rotator 30 is taken as a reference time (t=0); the following point in time at which the 4 bytes of the second column #2 are input to the first rotating block 30A is taken as time t=1; and the subsequent points in time at which the 4 bytes of the respective columns are sequentially input to the first rotating block 30A are taken as times t=2, 3, and so on.

First, at t=0, as illustrated on the second row of FIG. 8, the 4 bytes of the first column #1 to be input to the first rotating block 30A of the data rotator 30 include the invalid data S1 in the fourth lane. Consequently the bit values A1, A2, A3, and A4 of the respective stuff signals STF1$a$, STF2$a$, STF3$a$, and STF4$a$ to be input to the adding circuit 41 of the data rotator 30 (FIG. 5) become "0", "0", "0", and "1" respectively. At this stage, the count value indicated by the output signal C of the flip-flop 42 of the latter stage of the adding circuit 41 is an initial value "0", and therefore, the value obtained by the addition performed in the adding circuit 41 becomes "1". Therefore, the output signal ADD of the adding circuit 41 indicates "1" as a cyclic count value between 0 and 3.

Moreover, since the output signal C of the flip-flop 42 is in a state of the initial value, the decoder 43 outputs SC1=SC2=SC3=0 as initial values of the control signals SC1 to SC3. This control signal SC1 is directly given to the control terminal of the respective selectors 31A to 34A of the first rotating block 30A. Consequently, the DT1$a$+STF1$a$ signal is selected in the selector 31A, the DT2$a$+STF2$a$ signal is selected in the selector 32A, the DT3$a$+STF3$a$ signal is selected in the selector 33A, and the DT4$a$+STF4$a$ signal is selected in the selector 34A. Accordingly, the 4 bytes of the first column #1 are latched into the flip-flop 35A without being operated to rotate, while remaining in the arrangement (D1, D2, D3, S1). At the stage of t=0, there is no valid output from the flip-flop 35A. Moreover, the control signals SC2 and SC3 are latched into the flip-flops 44B and 44C$_1$.

At the next point in time t=1, as illustrated on the third row in FIG. 8, the 4 bytes of the second column #2 input to the first rotating block 30A of the data rotator 30 include the invalid data S2 in the fourth lane, and therefore, the respective bit values of the stuff signals STF1$a$ to STF4$a$ to be input to the adding circuit 41 are A1=0, A2=0, A3=0, and A4=1 respectively. Moreover, the output signal C of the flip-flop 42 of the latter stage of the adding circuit 41 indicates "1", which is the count value at the previous point in time t=0. Consequently, the value obtained by the addition performed in the adding circuit 41 becomes "2", which is obtained as a result of adding the respective bit values A1 to A4 and C. Therefore, the output signal ADD of the adding circuit 41 indicates "2" as a cyclic count value.

Moreover, the control signals SC1 to SC3 output from the decoder 43 are SC1=1, SC2=0, and SC3=0, because the output signal C of the flip-flop 42 indicates a count value "1". With this control signal SC1, the DT2$a$+STF2$a$ signal is selected in the selector 31A of the first rotating block 30A, the DT3$a$+STF3$a$ signal is selected in the selector 32A, the DT4$a$+STF4$a$ signal is selected in the selector 33A, and the DT1$a$+STF1$a$ signal is selected in the selector 34A. Accordingly, the 4 bytes of the second column #2 are operated to rotate upward only for one lane, and the arrangement of the 4 bytes of the second column #2 output from the respective selectors 31A to 34A becomes (D5, D6, S2, D4). The output signal of the flip-flop 35A indicates the arrangement of the 4 bytes of the first column #1 (D1, D2, D3, S1) latched at the previous point in time t=0.

Furthermore, to the control terminal of the respective selectors 31B to 34B of the second rotating block 30B, there is given an output signal of the flip-flop 44B, that is, a control signal SC2=0 at the previous point in time t=0. Therefore, the first lane side input signal is selected in the selector 31B, the second lane side input signal is selected in the selector 32B, the third lane side input signal is selected in the selector 33B, and the fourth lane side input signal is selected in the selector 34B. Accordingly, the data signals (the 4 bytes of the first column #1) output from the first rotating block 30A are latched into the flip-flop 35B without being operated to rotate, while remaining in the arrangement (D1, D2, D3, S1). At the stage of t=1, there is no valid output from the flip-flop 35B. Moreover, a control signal SC3=0 at the previous point in time t=0 is output from the flip-flop 44C$_1$ to the flip-flop 44C$_2$.

At the next point in time t=2, as illustrated on the fourth row in FIG. 8, the 4 bytes of the third column #3 input to the first rotating block 30A of the data rotator 30 include the invalid data S4 and S3 in the third and fourth lane, and therefore, the respective bit values of the stuff signals STF1$a$ to STF4$a$ to be input to the adding circuit 41 are A1=0, A2=0, A3=1, and A4=1 respectively. Moreover, the output signal C of the flip-flop 42 of the latter stage of the adding circuit 41 indicates "2", which is the count value at the previous point in time t=1. Consequently, the value obtained by the addition performed in the adding circuit 41 becomes "4", which is obtained as a result of adding the respective bit values of A1 to A4 and C. Therefore, the output signal ADD of the adding circuit 41 indicates "0" as a cyclic count value.

Moreover, the control signals SC1 to SC3 output from the decoder 43 are SC1=1, SC2=1, and SC3=0, because the output signal C of the flip-flop 42 indicates a count value "2". With this control signal SC1, in the first rotating block 30A, as with the case of t=1 described above, the 4 bytes of the third column #3 are operated to rotate upward only for one lane, and the arrangement of the 4 bytes of the third column #3 output from the respective selectors 31A to 34A becomes (D8, S4, S3, D7). The output signal of the flip-flop 35A indicates the arrangement of the 4 bytes of the second column #2 (D5, D6, S2, D4) latched at the previous point in time t=1.

Furthermore, to the control terminal of the respective selectors 31B to 34B of the second rotating block 30B, there is given an output signal of the flip-flop 44B, that is, a control signal SC2=0 at the previous point in time t=1. Therefore, the first lane side input signal is selected in the selector 31B, the second lane side input signal is selected in the selector 32B, the third lane side input signal is selected in the selector 33B, and the fourth lane side input signal is selected in the selector 34B. Accordingly, the data signals (the 4 bytes of the second column #2) output from the first rotating block 30A are latched into the flip-flop 35B without being operated to rotate, while remaining in the arrangement (D5, D6, S2, D4). The output signal of the flip-flop 35B indicates the arrangement of the 4 bytes of the first column #1 (D1, D2, D3, S1) latched at the previous point in time t=1.

In addition, to the control terminal of the respective selectors 31C to 34C of the third rotating block 30C, there is given an output signal of the flip-flop $44C_2$, that is, a control signal SC3=0 at the point in time t=0 before the previous time. Therefore, the first lane side input signal is selected in the selector 31C, the second lane side input signal is selected in the selector 32C, the third lane side input signal is selected in the selector 33C, and the fourth lane side input signal is selected in the selector 34C. Accordingly, the data signals (the 4 bytes of the first column #1) output from the second rotating block 30B are latched into the flip-flop 35C without being operated to rotate, while remaining in the arrangement (D1, D2, D3, S1). At the stage of t=2, there is no valid output from the flip-flop 35C.

At the next point in time t=3, as illustrated on the fifth row in FIG. 8, the 4 bytes of the fourth column input to the first rotating block 30A of the data rotator 30 do not include invalid data, and therefore, the respective bit values of the stuff signals STF1a to STF4a to be input to the adding circuit 41 are A1=0, A2=0, A3=0, and A4=0 respectively. Moreover, the output signal C of the flip-flop 42 of the latter stage of the adding circuit 41 indicates "0", which is the count value at the previous point in time t=2. Consequently, the value obtained by the addition performed in the adding circuit 41 becomes "0", which is obtained as a result of adding the respective bit values of A1 to A4 and C. Therefore, the output signal ADD of the adding circuit 41 indicates "0" as a cyclic count value.

Moreover, the control signals SC1 to SC3 output from the decoder 43 are SC1=0, SC2=0, and SC3=0, because the output signal C of the flip-flop 42 indicates a count value "0". With this control signal SC1, in the first rotating block 30A, as with the case of t=0 described above, the 4 bytes of the fourth column are latched into the flip-flop 35A without being operated to rotate, while remaining in the arrangement (D9, Da, Db, Dc). The output signal of the flip-flop 35A indicates the arrangement of the 4 bytes of the third column #3 (D8, S4, S3, D7) latched at the previous point in time t=2.

Furthermore, to the control terminal of the respective selectors 31B to 34B of the second rotating block 30B, there is given an output signal of the flip-flop 44B, that is, a control signal SC2=1 at the previous point in time t=2. Therefore, the second lane side input signal is selected in the selector 31B, the third lane side input signal is selected in the selector 32B, the fourth lane side input signal is selected in the selector 33B, and the first lane side input signal is selected in the selector 34B. Accordingly, the data signals (the 4 bytes of the third column #3) output from the first rotating block 30A are operated to rotate upward only for one lane, and the arrangement of the 4 bytes of the third column #3 to be output from the respective selectors 31B to 34B becomes (S4, S3, D7, D8). The output signal of the flip-flop 35B indicates the arrangement of the 4 bytes of the second column #2 (D5, D6, S2, D4) latched at the previous point in time t=2.

In addition, to the control terminal of the respective selectors 31C to 34C of the third rotating block 30C, there is given an output signal of the flip-flop $44C_2$, that is, a control signal SC3=0 at the point in time t=1 before the previous time. Accordingly, in the third rotating block 30C, as with the case of t=2 described above, the data signals (the 4 bytes of the second column #2) output from the second rotating block 30B are latched into the flip-flop 35C without being operated to rotate, while remaining in the arrangement (D5, D6, S2 D4). The output signal of the flip-flop 35A indicates the arrangement of the 4 bytes of the first column #1 (D1, D2, D3, Si) latched at the previous point in time t=2, and the output signal is transmitted to the buffer memory 50.

At the next point in time t=4 and thereafter, the 4 bytes of the first column #1 output from the data rotator 30 are input to the buffer memory 50 as described above. Therefore, the respective states for the 4 bytes of the first column #1 to the 4 bytes of the third column #3 will be mainly described, including the process in not only the data rotator 30 but also in the buffer memory 50 as illustrated on the first row in FIG. 9.

At the point in time t=4, the 4 bytes of the first column #1 in the arrangement (D1, D2, D3, Si) are input to the respective FIFOs 51 to 54 (FIG. 6) of the buffer memory 50. At this time, in the control circuit 58 that corresponds to the fourth lane, upon receipt of the stuff signal STF4b indicating that the input data to the FIFO 54 corresponds to the stuff position, the enable signal EN4 to be output to the FIFO 54 is turned to a low level, and data writing in the FIFO 54 is disabled. Accordingly, only the valid data D1 to D3 are respectively written into the FIFOs 51 to 53, and the invalid data 51 is removed. P1 to P4 illustrated on the right side of the FIFOs 51 to 54 on the first row in FIG. 9, denote the position of the beginning of the valid data in the columns within the respective FIFOs 51 to 54.

As for the 4 bytes of the second column #2, the arrangement thereof (D5, D6, S2, D4) at the previous point in time t=3 where they have been latched into the flip-flop 35C of the third rotating block 30C of the data rotator 30, serves as an output signal of the flip-flop 35C, and is transmitted to the buffer memory 50.

Moreover, as for the 4 bytes of the third column #3, an output of the flip-flop 35B of the second rotating block 30B indicates the arrangement (S4, S3, D7, D8), and the output signal is input to the respective selectors 31C to 34C of the third rotating block 30C. At this time, to the control terminal of the respective selectors 31C to 34C, there is given an output signal of the flip-flop $44C_2$, that is, a control signal SC3=0 at the point in time t=2 before the previous time. Accordingly, the 4 bytes of the third column #3 are latched into the flip-flop 35C without being operated to rotate in the third rotating block 30C, while remaining in the arrangement (S4, S3, D7, D8). The 4 bytes of the fourth column and thereafter may be considered similar to the cases of the first to third columns, and therefore descriptions thereof are omitted.

Figure 9:
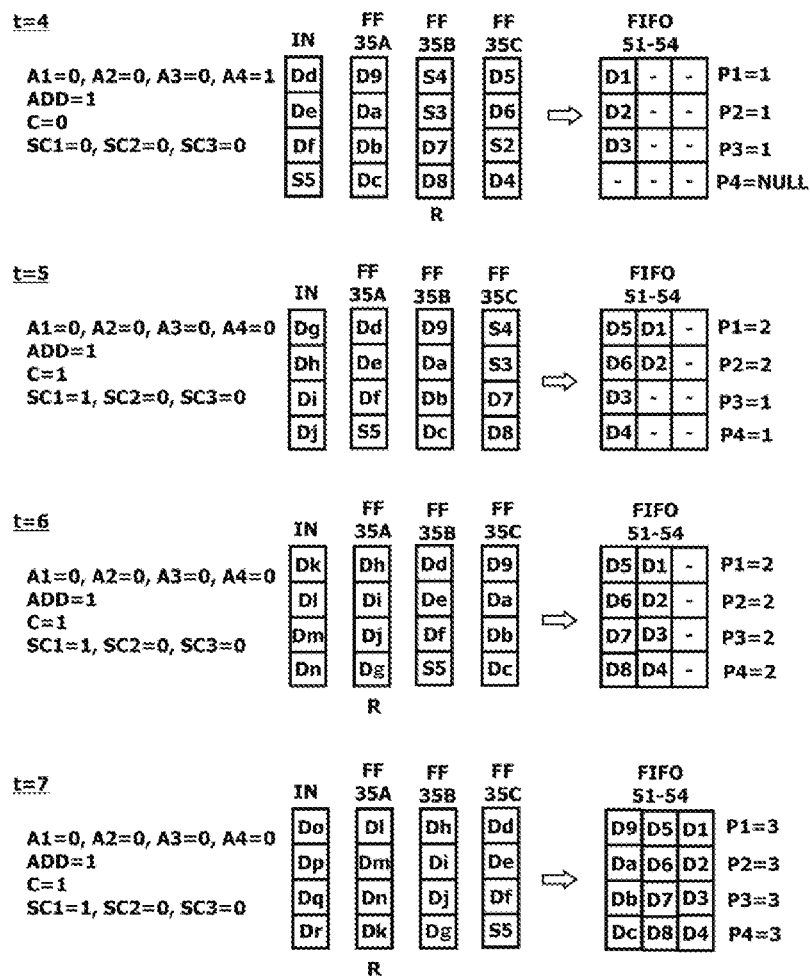
FIG. 9 is a diagram for describing processes performed in the data rotator in FIG. 5 and the buffer memory in FIG. 6.

At the next point in time t=5, as illustrated on the second row in FIG. 9, the 4 bytes of the second column #2 in the arrangement (D5, D6, S2, D4) are input to the respective FIFOs 51 to 54 of the buffer memory 50. At this time, in the control circuit 57 that corresponds to the third lane, upon receipt of the stuff signal STF3b indicating that the input data to the FIFO 53 corresponds to the stuff position, the enable signal EN3 to be output to the FIFO 53 is turned to a low level, and data writing in the FIFO 53 is disabled. Accordingly, only the valid data D5, D6 and D4 are respectively written into the FIFOs 51, 52, and 54, and the invalid data S2 is removed. As for the valid data D1 and D2 that were written into the FIFOs 51 and 52 at the previous point in time t=4, the positions thereof are shifted to right within the FIFOs 51 and 52 by the valid data D5 and D6 having been written in. The positions of the beginning of the valid data within the respective FIFOs 51 to 54 are P1=P2=2, and P3=P4=1 respectively.

As for the 4 bytes of the third column #3, the arrangement thereof (S4, S3, D7, D8) at the previous point in time t=4 where they have been latched into the flip-flop 35C of the third rotating block 30C of the data rotator 30, serves as an output signal of the flip-flop 35C, and is transmitted to the buffer memory 50.

At the next point in time t=6, as illustrated on the third row in FIG. 9, the 4 bytes of the third column #3 in the arrangement (S4, S3, D7, D8) are input to the respective FIFOs 51 to 54 of the buffer memory 50. At this time, in the control circuits 55 and 56 that correspond to the first and second lanes, upon receipt of the stuff signal STF2b indicating that the input data to the FIFOs 51 and 52 correspond to the stuff positions, the enable signals EN1 and EN2 to be output to the FIFOs 51 and 52 are turned to a low level, and data writing in the FIFOs 51 and 52 is disabled. Accordingly, the valid data D7 to D8 are respectively written into the FIFOs 53 and 54, and the invalid data S3 and S4 are removed. As for the valid data D3 and D4 that were written into the FIFOs 53 and 54 at the previous point in time t=5, the positions thereof are shifted to right within the FIFOs 53 and 54 by the valid data D7 and D8 having been written in. The positions of the beginning of the valid data within the respective FIFOs 51 to 54 are P1=P2=P3=P4=2 respectively.

At the next point in time t=7, as illustrated on the fourth row in FIG. 9, the 4 bytes of the fourth column in the arrangement (D9, Da, Db, Dc) are input to the respective FIFOs 51 to 54. However, none of these bytes corresponds to the stuff position, and are therefore respectively written into the respective FIFOs 51 to 54. As for the valid data D1 to D8 that have been written into the FIFOs 51 to 54 up to the previous point in time t=6, the positions thereof are shifted to right within the FIFOs 51 to 54 by the valid data D9 and Da to Dc having been written in. The positions of the beginning of the valid data within the respective FIFOs 51 to 54 are P1=P2=P3=P4=3 respectively. The valid data D1 to D4 positioned at the beginning of the respective FIFOs 51 to 54, are read out in synchronization with the timing of the reading clock signal CLK-R. A process similar to the above process is repeated at the point in time t=8 and thereafter, and thereby the data signals DT1out to DT4out that have been destuff-processed are output from the buffer memory 50.

As described above, according to the destuff circuit of the present embodiment, in the stuff shifter 10 and the data rotator 30 configured by multistage-connecting simple logical circuits that combine a plurality of selectors and flip-flops, input data to the destuff circuit are pipeline-processed and thereby realization of a function corresponding to the matrix switch in the conventional destuff circuit has been made possible. As a result, it is possible, at high speed, to remove invalid data inserted in arbitrary position of the input data. Therefore, it is possible to easily provide a destuff circuit capable of handling signals of even higher speed.

In the above embodiment, there was described a configuration example of the case where 32 bit parallel data signals are input to the destuff circuit and are destuff-processed on every 4 bytes. However, the invention may also be applied to a case where a destuffing process is performed on every arbitrary number of bytes (or on every arbitrary number of bits).

Figure 10:
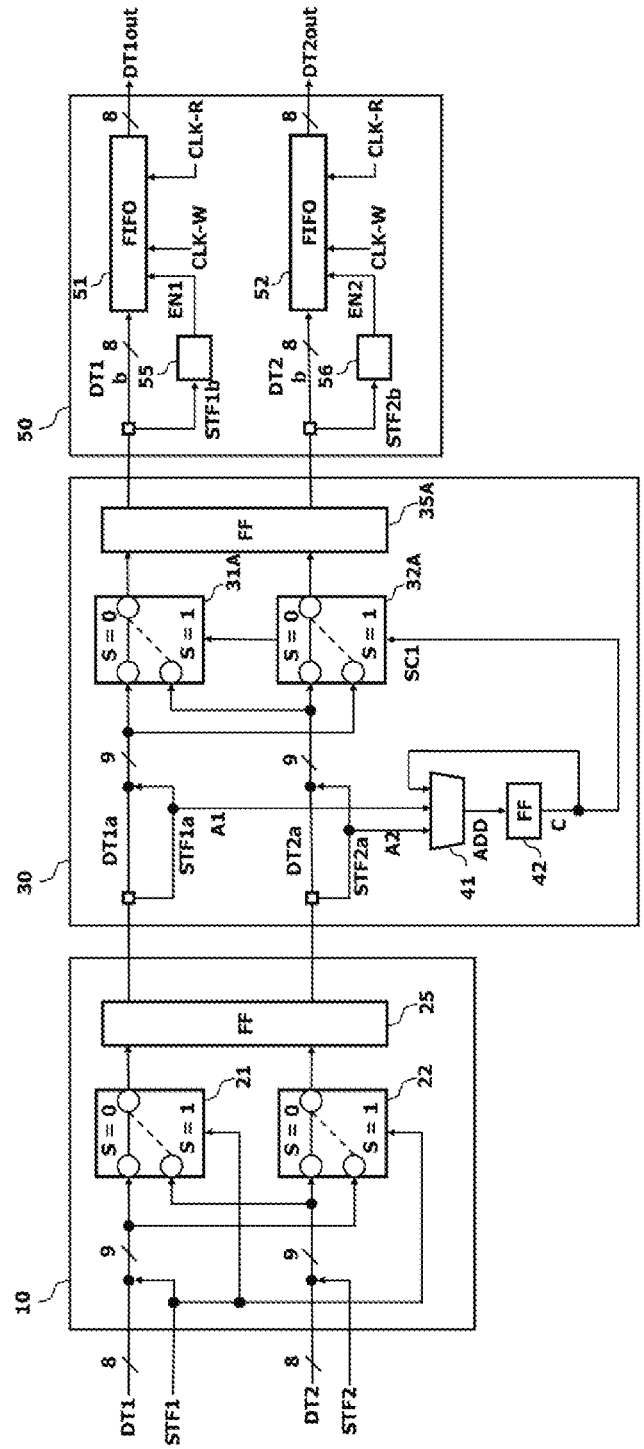
FIG. 10 is a diagram illustrating a configuration example in a case of performing a destuffing process per two bytes.

FIG. 10 illustrates a configuration example that corresponds to a case where 16 bit parallel data signals are destuff-processed on every 2 bytes. In this case, the stuff shifter 10 can realize, with a combination of the two selectors 21 and 22, and the flip-flop 25 in the first shifting block 11 of the embodiment described above, a bottom-packing process of invalid data. Moreover, with use of a combination of the two selectors 31A and 32A, and the flip-flop 35A in the first the rotating block 30A of the embodiment described above, the data rotator 30 detects the number of stuffs as a cyclic count value 0 or 1, using the adding circuit 41 and the flip-flop 42, and thereby it is possible to realize rotation-operation of the data of the respective columns according to the count value. Furthermore, with use of a combination of the two FIFOs 51 and 52, and the control circuits 55 and 56 in the embodiment described above, the buffer memory 50 can realize a process of removing invalid data and extracting only valid data. As for the data rotator 30, when performing a destuffing process on every N bytes where N is a positive number greater than or equal to 2, the data rotator 30 may be configured so that the number of stuffs is detected as a cyclic count value of from 0 to N−1, and a data rotation operation is performed by an N−1 stage-pipeline process.

Figure 11:
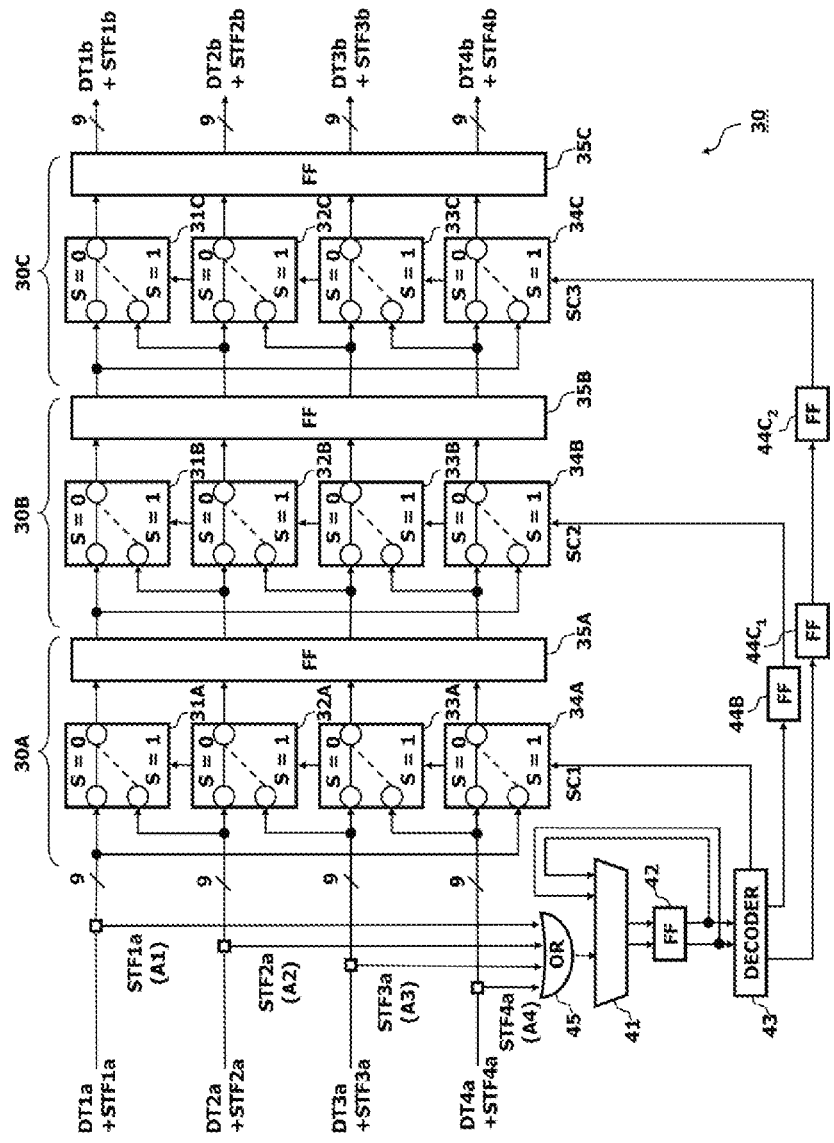
FIG. 11 is a circuit diagram illustrating an application example related to the data rotator in FIG. 5.

Moreover, as an example of an application related to the data rotator 30 illustrated in FIG. 5, in a case where a destuffing process is performed on every 4 bytes, if the number of stuffs included in the respective columns is one at most, that is to say, if there is applied a mapping specification in which the number of stuffs inserted in the consecutive 4 bytes is one or less, an OR circuit 45 may be inserted on the former stage of the adding circuit 41 as illustrated in FIG. 11, to thereby increase the speed of the process. In this application example, after a logical sum of the respective bit values of the stuff signals STF1a to STF4a has been calculated by the OR circuit 45, the calculated value of the logical sum (1 bit) and the previously calculated value output from the flip-flop 42 (2 bit) are added in the adding circuit 41, and thereby the number of stuffs up to the current point in time is counted. In general, an adding circuit is known for the possibility that the operating speed thereof may be reduced if the number of inputs to be added increases. Consequently, in the circuit configuration of FIG. 11, the input of the adding circuit 41 is limited to 1 bit signals output from the OR circuit 45 and 2 bit signals output from the flip-flop 42, to thereby achieve an increase in the operating speed of the adding circuit 41. In a case where a destuffing process is performed on every N bytes, increasing the speed of the adding circuit 41 using such an OR circuit 45 is effective for a mapping specification where the number of stuffs inserted in consecutive M bytes is one or less. That is to say, in a case where a relationship M≧N is true in a configuration in which the data rotator 30 performs data rotation operations on every N bytes, a circuit configuration similar to that of the FIG. 11 may be applied. Moreover, in a case where M<N is true, by calculating the logical sum of the stuff signals on every M bytes to generate 1 bit number information, and then giving the number information to the adding circuit 41, it is possible to make the process of the adding circuit 41 faster, compared to the case of the configuration where a logical sum calculation is not performed (FIG. 5).

Next, there is described a transmission device that uses the destuff circuit described above.

Figure 12:
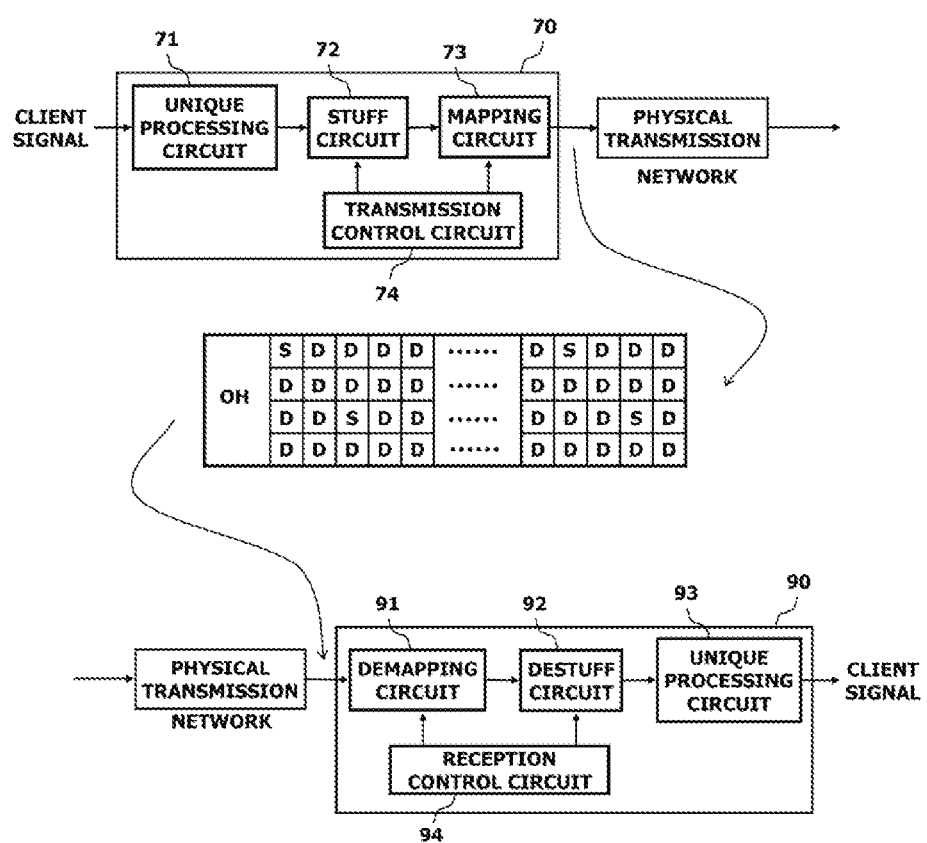
FIG. 12 is a block diagram illustrating a transmission device that uses the destuff circuit, and a network configuration to which the transmission device is applied.

FIG. 12 is a block diagram illustrating a configuration of an embodiment of the transmission device, and a configuration of the entire network to which the transmission device is applied.

A transmission device 70 on the transmitting side illustrated on the upper section of FIG. 12 is to perform a stuffing process and mapping process of client signals in order to transmit client signals (asynchronous signals) input from the outside to a network of a different speed (synchronous network). Moreover, a transmission device 90 on the receiving side illustrated on the lower side of FIG. 12 is configured with use of the destuff circuit of the above embodiment, and is to perform a demapping process and destuffing process of the signals having been transmitted through the network, to thereby re-generate the client signals. Here, a configuration example of the network where signal transmission is performed in one direction is shown. However, by separately providing a transmission device in which the relationship of the transmitting side and the receiving side are reversed, or providing, on both ends of the network, transmission devices in which transmitting and receiving are integrated, it is possible to handle bidirectional signal transmission.

The transmission device on the transmitting side is, for example, provided with a unique processing circuit 71, a stuff circuit 72, a mapping circuit 73, and a transmission control circuit 74.

The unique processing circuit 71 is a circuit that processes a protocol and the like dependent on client signals, and performs data processing as necessary.

The stuff circuit 72 receives an input of client signals having been processed in the unique processing circuit 71, and inserts invalid data in the stuff positions instructed by the transmission control circuit 74 or allocates valid data of the client signals according to the amount of the information of the client signals, to thereby perform an adjustment between the speed of the client signals (clock frequency) and the signal speed on the network (clock frequency).

FIG. 13 is a circuit diagram illustrating an example of a specific configuration of the above stuff circuit 72. This stuff circuit 72 of FIG. 13 receives inputs of data signals DT1s to DT4s in which 32 bit parallel data signals output from the unique processing circuit 71 are assigned to four lanes on a byte unit basis, and receives, from the transmission control circuit 74, inputs of stuff signals STF1s to STF4s that indicate stuff positions corresponding to the respective data signals DT1s to DT4s. This stuff circuit 72 is of a configuration that combines four-stage shifting blocks 80A to 80D.

The first shifting block 80A has four 2-input/1-output selectors 81A to 84A, and a flip-flop 85A. The selector 81A receives an input of the data signal DT1s to one input terminal thereof, and receives an input of invalid data Si (for example, data of bit value "00000000") to the other input terminal thereof. The selector 82A receives an input of the data signal DT2s to one input terminal thereof, and receives an input of the data signal DT1s to the other input terminal thereof. The selector 83A receives an input of the data signal DT3s to one input terminal thereof, and receives an input of the data signal DT2s to the other input terminal thereof. The selector 84A receives an input of the data signal DT4s to one input terminal thereof, and receives an input of the data signal DT3s to the other input terminal thereof. To the control terminal of the respective selectors 81A to 84A, there is given the stuff signal STF1s. In a case where the bit value of the stuff signal STF1s is "0", this first shifting block 80A transmits the data signals DT1s to DT4s without altering them, to the second shifting block 80B through the flip-flop 85A. On the other hand, in a case where the bit value of the stuff signal STF1s is "1", the invalid data Si is selected in the selector 81A, and the invalid data Si and the data signals DT1s to DT3s having been downward-shifted respectively by one lane, are transmitted to the second shifting block 80B through the flip-flop 85A.

The second shifting block 80B has three 2-input/2-output selectors 82B to 84B, and a flip-flop 85B. The selector 82B receives an input of the output signal corresponding to the second lane of the flip-flop 85A of the former stage, to one input terminal thereof, and receives an input of the invalid data Si to the other input terminal thereof. The selector 83B receives an input of the output signal corresponding to the third lane of the flip-flop 85A, to one input terminal thereof, and receives an input of the output signal corresponding to the second lane of the flip-flop 85A to the other input terminal thereof. The selector 84B receives an input of the output signal corresponding to the fourth lane of the flip-flop 85A, to one input terminal thereof, and receives an input of the output signal corresponding to the third lane of the flip-flop 85A to the other input terminal thereof. To the control terminal of the respective selectors 82B to 84B, there is given the stuff signal STF2s through one flip-flop 86B. In a case where the bit value of the stuff signal STF2s is "0", this second shifting block 80B transmits the output signals from the flip-flop 85A corresponding to the respective lanes, without altering them, to the third shifting block 80C through the flip-flop 85B. On the other hand, in a case where the bit value of the stuff signal STF2s is "1", the invalid data Si is selected in the selector 82B, and signals, in which the invalid data Si and the respective output signals corresponding to the second and third lanes of the flip-flop 85A have been downward-shifted respectively by one lane, are transmitted to the third shifting block 80C through the flip-flop 85B.

The third shifting block 80C has two 2-input/1-output selectors 83C and 84C, and a flip-flop 85C. The selector 83C receives an input of the output signal corresponding to the third lane of the flip-flop 85B of the former stage, to one input terminal thereof, and receives an input of the invalid data Si to the other input terminal thereof. The selector 84C receives an input of the output signal corresponding to the fourth lane of the flip-flop 85B, to one input terminal thereof, and receives an input of the output signal corresponding to the third lane of the flip-flop 85B to the other input terminal thereof. To the control terminal of the respective selectors 83C and 84C, there is given the stuff signal STF3s through two flip-flops $86C_1$ and $86C_2$. In a case where the bit value of the stuff signal STF3s is "0", this third shifting block 80C transmits the output signals from the flip-flop 85B corresponding to the respective lanes, without altering them, to the fourth shifting block 80D through the flip-flop 85C. On the other hand, in a case where the bit value of the stuff signal STF3s is "1", the invalid data Si is selected in the selector 83C, and signals, in which the invalid data Si and the output signal corresponding to the third lane of the flip-flop 85B have been downward-shifted by one lane, are transmitted to the fourth shifting block 80D through the flip-flop 85C.

The fourth shifting block 80D has a 2-input/1-output selector 84D. The selector 84D receives an input of the output signal corresponding to the fourth lane of the flip-flop 85C of the former stage, to one input terminal thereof, receives an input of the invalid data Si to the other input terminal, and the stuff signal STF4s is given to the control terminal through three flip-flops $86D_1$ to $86D_3$. In a case where the bit value of the stuff signal STF4s is "0", this fourth shifting block 80D transmits the output signals from the flip-flop 85C corresponding to the respective lanes to the mapping circuit 73 (FIG. 12) without altering them. On the other hand, in a case where the bit value of the stuff signal STF4s is "1", the invalid data Si is selected in the selector 84D and is transmitted to the mapping circuit 73.

The stuff circuit 72 illustrated in FIG. 13 is of a configuration with multiple-staged simple logical circuits combining a plurality of selectors and flip-flops, and it uses no matrix switches having a complex circuit configuration. Therefore, it is capable of performing a stuffing process at high speed.

The mapping circuit 73 receives inputs of data signals DT1s' to DT4s' having been processed in the stuff circuit 72, and according to the mapping information instructed by the transmission control circuit 74, writes necessary information in the overhead portion of the required frame and processes the data into a format that can be transferred to the network side.

The transmission control circuit 74, based on the predefined mapping specification, generates a signal that gives the stuff circuit 72 an instruction of the stuff position to which invalid data is to be inserted, and generates a signal that gives the mapping circuit 73 an instruction of information such as timing of overhead insertion.

In the transmission side transmission device 70 described above, a stuffing process and mapping process of client signals are performed, and thereby, there is generated a signal in the required frame format having an overhead (OH) portion and payload portion illustrated in the center section of FIG. 12 for example, and the signal is physically transferred using a medium required for network transfer and is transmitted to the transmission device 90 on the opposing receiving side. The payload portion of the signal includes invalid data illustrated with "S" and valid data illustrated with "D", and the stuff information that indicates an invalid byte insertion position is shared between the transmission devices 70 and 90, which oppose to each other.

The receiving side transmission device 90 is, for example, provided with a demapping circuit 91, a destuff circuit 92 illustrated in FIG. 3 to FIG. 6 described above, a unique processing circuit 93, and a reception control circuit 94.

The demapping circuit 91 receives signals having been transmitted through the network, extracts the overhead portion of the received signals and reads information according to the mapping information instructed from the reception control circuit 94, and performs a demapping process of the received signals based on the overhead information.

The destuff circuit 92 receives the signals having been processed in the demapping circuit 91 as the data signals DT1 to DT4 to be input to the stuff shifter 10 illustrated in FIG. 4 described above, and receives signals indicating the stuff positions output from the reception control circuit 94 as the stuff signals STF1 to STF4 corresponding respectively to the data signals DT1 to DT4. In this destuff circuit 92, as described in the above embodiment, there is performed a destuffing process in which invalid data included in the received signals are removed and only valid data are extracted.

The unique processing circuit 93 performs a process of converting the signals that have been processed in the destuff circuit 92 into a protocol and the like that are suitable for client signals.

The reception control circuit 94, based on the predefined mapping specification, generates a signal that gives the demapping circuit 91 an instruction of information such as overhead extraction timing, and generates a signal that gives the destuff circuit 92 an instruction of the stuff position of the received signal. Here, stuff positions are determined based on the mapping specification, however, stuff positions may be calculated based on the overhead information of the received signal.

According to the receiving side transmission device 90 described above, after having demapped the signals that have been transmitted through the network, invalid data inserted in arbitrary positions of the received signals can be removed at high speed as with the case of the embodiment described above, and therefore, it is possible to reliably regenerate even faster client signals.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A destuff circuit that parallel-processes input data to thereby remove invalid data inserted in a stuff position of the input data and extract valid data, the destuff circuit comprising:
    a stuff shifter configured to input a plurality of data signals assigned to a plurality of lanes, and a plurality of stuff signals indicating a stuff position of each of the data signals, and configured to shift within a column invalid data inserted in the stuff position of each of the data signals so that the invalid data is placed continuously from one end of the column;
    a data rotator configured to input data signals of the respective lanes output from the stuff shifter, and stuff signals that respectively correspond to the respective data signals, and configured to detect, based on the respective stuff signals, a number of stuffs of each column, and configured to operate to rotate the data in the respective lanes of respective columns by moving the data in the respective lanes in one direction within the respective columns by a number of lanes according to the detection results, wherein the destination for the movement of the data in a lane placed in one end of a column by one lane is a lane placed in another end of the column; and
    a buffer memory configured to store and output valid data included in the data signal of each lane output from the data rotator in first-in-first-out fashion.

2. A destuff circuit according to claim 1, wherein the stuff shifter has at least one shifting block that is constituted by a logical circuit including 2-input/1-output selectors and a flip-flop.

3. A destuff circuit according to claim 1, wherein the data rotator, for data signals of N lanes output from the stuff shifter where N is a positive number greater than or equal to 2, detects a number of the stuffs as a cyclic count value of from 0 to N−1, and performs a data rotation operation by pipeline processing using a N−1 stage rotation block constituted by a logical circuit including 2-input/1-output selectors and a flip-flop, corresponding to the cyclic count value.

4. A destuff circuit according to claim 3, wherein in the data rotator, an adding circuit to which stuff signals respectively corresponding to data signals of the N lanes are input, and a flip-flop that latches an output signal of the adding circuit are combined, and in the adding circuit, bit values of the respective stuff signals, and a bit value of the output signal of the flip-flop are added, and the added value is made a cyclic count value of from 0 to N−1 to thereby detect the number of stuffs.

5. A destuff circuit according to claim 4, wherein in the data rotator, in a case where the number of stuffs included in the respective columns of the data signals of the N lanes is one at most, an OR circuit is provided on a former stage the adding circuit, and the OR circuit calculates a logical sum of the bit values of the respective stuff signals, and the adding circuit adds the calculated value of the OR circuit and the bit value of an output signal of the flip-flop.

6. A destuff circuit according to claim 1, wherein in the stuff shifter, signals transmitted through a synchronous network are input as the plurality of data signals, and the buffer memory detects non synchronous signals that are slower than the signal speed of the synchronous network.

7. A transmission apparatus comprising a destuff circuit according to claim 1.

8. A transmission apparatus according to claim 7, comprising:

a demapping circuit configured to perform a demapping process on signals having been transmitted through the network, to output to the destuff circuit;

a unique processing circuit configured to process signals output from the destuff circuit, to generate a client signal; and a reception control circuit configured to control the destuff circuit and the demapping circuit based on a predefined mapping specification.

9. A transmission apparatus according to claim 8, comprising:

a unique processing circuit on a transmission side configured to process input client signals;

a stuff circuit configured to insert invalid data to a predetermined stuff position, corresponding to an information value of a client signal processed in the unique processing circuit on the transmission side to thereby perform an adjustment between a speed of the client signal and a signal speed on the network;

a mapping circuit configured to mapping process a signal processed in the stuff circuit, to transmit to the network; and a transmission control circuit configured to control the stuff circuit and the mapping circuit based on the mapping specification.

* * * * *